(12) United States Patent
Väth (10) Patent No.: US 7,149,925 B2
(45) Date of Patent: Dec. 12, 2006

(54) PERIPHERAL COMPONENT WITH HIGH ERROR PROTECTION FOR STORED PROGRAMMABLE CONTROLS

(75) Inventor: Joachim Väth, Schwaig (DE)

(73) Assignee: Siemens Aktiengesellschaft, Munich (DE)

( * ) Notice: Subject to any disclaimer, the term of this patent is extended or adjusted under 35 U.S.C. 154(b) by 541 days.

(21) Appl. No.: 10/276,715

(22) PCT Filed: May 17, 2001

(86) PCT No.: PCT/DE01/01885

§ 371 (c)(1), (2), (4) Date: Nov. 18, 2002

(87) PCT Pub. No.: WO01/88711

PCT Pub. Date: Nov. 22, 2001

(65) Prior Publication Data

US 2004/0078715 A1 Apr. 22, 2004

(51) Int. Cl.
*G06F 11/00* (2006.01)
(52) U.S. Cl. .......................... 714/30; 714/43; 324/763
(58) Field of Classification Search .................. 714/40, 714/41, 44, 740, 11, 30, 31; 700/82, 79, 700/90, 81, 19, 21; 375/224; 710/15; 361/78; 702/120
See application file for complete search history.

(56) References Cited

U.S. PATENT DOCUMENTS

| 4,199,799 | A | * | 4/1980 | Ostenso et al. ............... 361/78 |
| 4,412,280 | A | | 10/1983 | Murphy et al. |
| 4,542,506 | A | * | 9/1985 | Oe et al. ....................... 714/30 |
| 4,692,298 | A | * | 9/1987 | Coradi et al. ................ 376/215 |
| 4,907,228 | A | * | 3/1990 | Bruckert et al. ............... 714/11 |
| 5,088,021 | A | | 2/1992 | McLaughlin et al. |
| 5,508,910 | A | * | 4/1996 | Diehl ........................... 700/82 |
| 5,589,766 | A | * | 12/1996 | Frank et al. .............. 324/158.1 |
| 5,970,430 | A | * | 10/1999 | Burns et al. ................. 702/122 |
| 6,377,859 | B1 | * | 4/2002 | Brown et al. .................. 700/79 |
| 6,604,006 | B1 | * | 8/2003 | Zeilinger ...................... 700/79 |
| 6,909,923 | B1 | * | 6/2005 | Vasko et al. ................... 700/79 |

FOREIGN PATENT DOCUMENTS

| DE | 4235872 C2 | 4/1994 |
| DE | 4408603 A1 | 9/1995 |
| DE | 4416795 A1 | 11/1995 |
| DE | 19814102 A1 | 12/1998 |
| DE | 19860358 A1 | 7/2000 |
| DE | 19904892 A1 | 8/2000 |

OTHER PUBLICATIONS

Peter Wratil, "Speicherprogrammierbare Steuerungen", Steuerungstechnik, 1986, pp. 128-137.

* cited by examiner

*Primary Examiner*—Bryce P. Bonzo
*Assistant Examiner*—Philip Guyton
(74) *Attorney, Agent, or Firm*—Staas & Halsey LLP (57) ABSTRACT

The invention relates to a peripheral component with high error protection for stored programmable controls. The invention relates particularly to an analog-input circuit with at least two channels substantially identical in design, for parallel signal input and/or output, which are parallel connected and/or parallel connectable in the region of the peripheral interface. Said analog-input circuit also comprises at least one data processing component (µP or µC) for testing the channels without any disruption of the data flows.

34 Claims, 2 Drawing Sheets

PERIPHERAL COMPONENT WITH HIGH ERROR PROTECTION FOR STORED PROGRAMMABLE CONTROLS

CROSS REFERENCE TO RELATED APPLICATIONS

This application is based on and hereby claims priority to PCT Application No. PCT/DE01/01885 filed on May 17, 2001, German Application No. 100 24 479.3 filed on May 18, 2000, and German Application No. 100 35 174.3 filed on Jul. 19, 2000, the contents of which are hereby incorporated by reference.

BACKGROUND OF THE INVENTION

The invention relates to an interface module having a high level of error immunity for programmable logic controllers, particularly to an analog-input circuit.

U.S. Pat. No. 5,508,910 discloses a redundant analog input/output system having two identical analog input/output units, with in respective input/output unit being in operating mode and the respective other one being in monitor mode. Each analog input/output unit has a microcomputer, two D/A converters and a D/A converter. In a fault situation, the respective microcomputer for one analog input/output unit switches itself to monitor mode and switches the respective other input/output unit to operating mode.

If industrial and other, technically complicated plant processes are being automated to an ever increasing extent through the use of programmable logic controllers, then this was probably originally influenced by the idea of transferring simple activities, such as the activation of various processing steps in a serial processing process, and simple control sections, e.g. filling-level control sections or temperature control sections. The design of control loops had resulted in feedback of process signals, and this tendency finally resulted in the transfer of extensive monitoring tasks to programmable logic controllers. In this context, however, it is found that when a monitoring person delegates such tasks to a machine, one human property important to monitoring tasks is of very great significance, namely the responsibility for preventing accidents and other damage during operation of a plant as far as possible and of ensuring the highest possible level of safety for people, machines and the environment. The regularly recurring reports about the escape of poisonous gases from plants in the chemical industry and the countless risks lying in wait as a result of the use of large amounts of power in a wide variety of plants in the raw-materials industry, power generation, mechanical conveying and handling, mechanical working and automated production have to be regarded in this context as an incentive to increase plant safety further.

In this context, malfunctioning of individual plant parts can probably never be ruled out, and the task of an automatic controller therefore needs to be to identify such malfunctions and to initiate countermeasures or to shut down the plant or trigger an alarm as quickly as possible. However, it can only perform this task if it is certain to work correctly itself even, and specifically, upon the occurrence of malfunctions in the plant. Although the use of microelectronics in millions of wristwatches, household appliances, aircraft and vehicles shows that the greatest risk when operating an electronic circuit is probably failure of the supply voltage, particularly a drop in the battery voltage, it must not be forgotten that industrial plants are operated on a crude basis and only rarely is it possible to presuppose an atmosphere which is entirely free of vapors, gases and other chemicals. For this reason, particularly in the case of critical processes in which there should be no malfunction if at all possible, additional measures should be taken in order to increase the operational reliability of the control device further.

When dealing with this problem, the design of a programmable logic controller should be recalled: to allow optimum matching to a very wide variety of application instances, a modular design has been implemented for this in practice, the core of the programmable logic controller being formed by a central processor unit which processes a program specific to the application instance in question. By contrast, the interfaces to the individual actuators for the process in question and also hived-off subfunctions, such as control sections, are held in modules which are separate therefrom and are normally all coupled to a communications line, for example in the form of a serial bus, so that information interchange between the various components is possible. In such a case, an error can theoretically occur in all the components, i.e. both in the central processor unit and in the connected components, and also on the communications line connecting them to one another.

While the first two sources of error can be prevented, or can be reduced to an extremely minimal residual risk, for critical processes by increasing the availability, for example by using a second central processor unit connected in parallel and/or a second communication bus operated in parallel, duplication of all other components in most application instances would entail a substantial level of additional involvement, and the enormous increase in complexity would additionally mean that it would instead even impose the risk of additional sources of error as a result of wiring or setting errors. In addition, the interchange of information via the communications line in question would be at least doubled in such a case, which would necessitate a further power increase for the controller. It should then be remembered that, on the other hand, increased significance should specifically be attached to the interface modules as the interface between the process and the controller, since failure of such a component may result in crucial signals being lost or in the influence of the controller on the process being restricted or even interrupted.

SUMMARY OF THE INVENTION

The drawbacks of the above approach are why one potential object for the invention is to provide an interface module for programmable logic controllers which itself already has an increased level of error immunity, so that it is possible to achieve a high level of error coverage even without using a redundant component.

This problem is solved by at least two channels of largely identical design for parallel signal input and/or output which are connected in parallel, and/or can be connected in parallel, in the region of the peripheral interface, and by at least one data processing block ($\mu P$ or $\mu C$) for testing the channels without interrupting the flow of data.

Potential benefits associated with the above interface module include: on the one hand, the interface module already contains a second channel, which means that redundancy is already provided internally. In addition, a data processing block is provided which performs a test on one or both channels permanently or at least at short intervals of time in parallel with the ordinary flow of data, which relieves both the communication line to the central processor unit and the central processor unit itself of this task. As soon as a malfunction in one or both channels has been identified, on the other hand, the data processing block performing the test can immediately report this to the central processor unit so that, in such a case, a countermeasure can immediately be introduced before a malfunction can occur in the plant itself. This ensures that, if a fault situation arises in the plant, at least one channel in the interface block is always intact, which means that information interchange between plant and controller is ensured.

The interface module is also distinguished by a second data processing block (µP or µC) for conditioning the data to be transferred during a test phase. On the one hand, this second data processing block provides redundancy if the first data processing block fails, and on the other hand, in such a case, data conditioning can also take place in the channel which adopts the flow of data, in which case, by way of example, if an input signal which is to be expected does not appear, an error message can be triggered; in addition, the data format can be converted into a for communication with the central block or for communication with the data processing block performing the test.

It has been found to be beneficial for each of the two data processing blocks to be associated with one respective channel and to be designed such that they can undertake both the signal conditioning and the testing for this channel. The firm association between the two data processing blocks and a respective channel affords a simplification in terms of circuitry by virtue of no further circuit element needing to be provided between the channel block in question and the associated data processing block, which means that such circuit elements cannot be a source of error.

The interface module provides for the two data processing blocks to be coupled to one another for the purpose of information interchange. This coupling is firstly important for coordinating the operation of the two channel blocks so that a correct flow of data always takes place on at least one channel, and secondly test results can be exchanged, for example, so that each of the two data processing blocks is always informed about the state of both channels and can not just orient its own operation thereto, but rather can also immediately provide a central processor unit with the necessary information upon request.

The interface module can be developed such that the two data processing blocks are coupled to one another via in-module connections. This measure reduces the signal traffic on the connecting line between the individual components of the programmable logic controller.

Other advantages can be obtained by virtue of the two data processing blocks being coupled via a memory to which they both have access. The data processing blocks can use this common memory to store the information intended for the respective other block, and this information can then be fetched from the memory at a given time, i.e. when needed. This avoids unnecessary waiting times for a data processing block.

One refinement can provide for the two data processing blocks to be connected to different inputs/outputs for the memory (dual-port RAM). In such a case, the communication between each of the two data processing blocks and the common memory is entirely independent of the operation of the respective other block, and particularly of its clocking. This allows largely autarkic systems to be provided for each of the two data processing blocks, which means that smooth operation of at least one signal can be ensured even if an error has occurred in the other channel block and/or in the data processing block controlling it.

The performance of the interface module can be increased by virtue of a two-channel input module being provided with an additional output channel, and a two-channel output module being provided with an additional read-in channel, which can be coupled to each of the two remaining channels in order to form a loop via a respective one of the two parallel channels, so that correct processing of a test signal can be checked. While, in the absence of such an arrangement, at best a test is possible by comparing the signals which are output by the two channel blocks, a test channel complementary thereto can close a loop via a respective one of the two channel blocks, and a genuine test on the absolute accuracy of all the components in this loop is thus possible by comparing the input signal for this loop with its output signal. Accordingly, as soon as an error occurs which means that a channel block no longer works correctly, then such a test setup can be used to establish clearly which of the two channel blocks has the fault, and the flow of data can then be routed via the channel block which is still intact until the faulty channel block has been replaced or repaired. The arrangement is therefore used not just for sensing an error; rather, this error can also be clearly located and, provided that a single channel block is still working, the interface module can perform its function.

To simplify the design complexity, the actuation for the test channel can be transferred to one of the two data processing blocks. Although it would be conceivable to access control of the test channel block in both data processing blocks in order to increase redundancy further, this is found not to be necessary, since, if one channel block fails, it is no longer possible to perform a test anyway, because the normal flow of data must have been interrupted in such a case. For this reason, the actuation for the test channel block can be firmly associated with one of the two data processing blocks, so that an additional switch and interposed OR gates or the like are not necessary and the likelihood of failure is reduced further.

Superfluous sources of error can be avoided by virtue of the two channels being arranged on the same circuit board. This design specification is based on the realization that every connector, and particularly every cable connection, has a higher likelihood of failure than a conductor track on a circuit board, where at most a poor solder connection could result in a fault.

The same purpose is served by a development in which at least one data processing block is arranged together with the two channels on the same circuit board. This measure also reduces the number of plug and solder connections and thus increases the operational reliability of the interface module.

So that scattered noise is kept away from the evaluation electronics, both channels, preferably including a test channel, are provided with potential isolators. The task of these potential isolators is that of completely removing a signal's pure information value from its actual voltage potential, so that dangerous noise, which can originate from the process or can be scattered on the supply lines in question, cannot harm the sensitive microelectronics. This can be implemented most effectively using optocouplers, which are used by the absence of potential when transmitting light.

The design complexity can be reduced further if signal conversion takes place between analog current or voltage levels, on the one hand, and an alternating signal (pulse train) having a frequency which is proportional to the analog signal, on the other hand. While the data processing blocks ultimately use a sequence of binary number representations for the particular amplitude of the analog signal, the interposition of an alternating signal having a variable frequency affords the advantage that all of the information about the amplitude value can be transferred on a single signal line, with an analog circuit which is less susceptible to interference being able to be used, on the other hand.

In such a case, it is possible to use the potential isolator for the alternating signal, for example using optocouplers. Since this alternating signal contains the entire information content about the signal amplitude which is to be transferred, it is suitable as a preference for the potential isolator. Firstly, it saves increased complexity for the potential isolator, as would be the case with a binary signal, for example, and secondly the potential isolator can be of much simpler design in the case of a signal which alternates between two voltage ranges and whose exact amplitude carries no information than in the case of a pure analog signal, where the information corresponds to the voltage amplitude in question.

To decrypt the alternating signal, it can be supplied to a counter module which, by counting the pulses within a fixed interval of time, produces a digital value which is proportional to the frequency of the alternating signal. This involves an extremely simple design, where only after the expiry of a firmly prescribed interval of time is it necessary to request the counter reading and then to reset the counter to zero again. The resolution which can be achieved with this signal conversion depends on the interval of time, on the one hand, and on the frequency of the alternating signal, on the other hand. To be able also to transfer voltages having the amplitude zero or even negative voltages with sufficient resolution within the scope of this method, the relevant voltage interval should be transformed to a frequency range which extends upward from a minimum frequency corresponding to the minimum voltage amplitude.

In the opposite signal direction, the alternating signal should be removed from a module having a sequential output, for example from a shift register, which outputs a prescribable number of output bits in a prescribed interval of time. The opportunities for generating the alternating signal are manifold. Since the individual pulses do not need to be split uniformly over the interval of time in question, it would be possible to output pulses derived from the clock frequency, for example, with counting simultaneously being able to take place in order to compare the current counting result with the prescribed value using a comparator and to suppress the transfer of further pulses when the prescribed value has been reached. Another option involves writing the relevant number of pulses to a shift register and then outputting the latter's content serially to the channel block in question within the prescribed interval of time.

To operate the interface module, one channel is always to be used for signal transmission, while the other is operated for test and/or correction purposes. In such a case, the test can be carried out entirely invisibly to the central processor unit for the programmable logic controller in question, i.e. this programmable logic controller always has the information it requires delivered to it, largely without delay, and can rely on the fact that signals which it outputs to the plant also arrive at the plant virtually without delay, provided that the interface block in question does not fail completely.

A component test can be carried out by virtue of the output signals on the two channels being subtracted from one another, with the result of the subtraction being compared with at least one prescribed limit value in order to identify an error if there is a relatively large discrepancy. This mode can be used in order to identify an error occurring in a channel block immediately, since in such a case a difference significantly other than zero arises. In this case, this comparison can be performed both for an input block and for an output block if the output is provided, by way of example, with an appropriate analog circuit having an operational amplifier connected as a subtractor, possibly an absolute-value generator and a comparator for comparing the absolute difference with a prescribed and still tolerable limit value. The acknowledgement from this test block can be provided using a single signal, for example the output signal from the comparator, which means that a potential isolator can be very simply produced in this case too.

In another test mode, one channel is used for signal transmission and the other is meanwhile subjected to a test by outputting a test signal and reading it in again, the signal value which is output and the signal value which is read in being subtracted from one another, and the result of the subtraction finally being compared with at least one prescribed limit value in order to identify an error if there is a relatively large discrepancy. While parallel operation of the two channels and comparison of their output signals make it possible to establish whether an error has actually occurred in one of these two channels, the latter test mode even makes it possible to ascertain which of the two channels is faulty. This is achieved by connecting the channel which is to be examined as part of a signal transmission loop, and comparing the output signal from this loop with its input signal allows a malfunction in the channel block in question to be diagnosed if there is an identifiable discrepancy. In such a case, this channel can be selectively disconnected, and then just the remaining channel can be used temporarily until the fault has been eliminated as a result of an alarm triggered by the error message.

To allow early identification of an error which has occurred, the test mode should be repeated at short intervals of time, with first one channel and then the other being respectively tested, and the respective other one undertaking the signal transmission in the meantime. In the extremely unlikely situation in which both channel blocks become damaged at the same time, comparison of the output signals might possibly establish no error if, by way of example, both output signals adopt zero voltage at the same time. However, this situation can be prevented or identified by regularly testing the absolute operability of the channel blocks. For this reason, at least one of the two channel blocks should be examined at short intervals of time with regard to its absolute operability. Since simultaneous failure of both channel blocks is an extremely rare event, these absolute operation tests can be carried out at relatively long intervals of time, for example approximately once per second. Provided that the channel blocks connected in parallel are not compared during normal operation, the flow of data between the two channel blocks should be changed over at correspondingly short intervals of time and, in the meantime, at least one test on the channel block which has not been required up until then should be carried out in each case.

Optimum results can be attained if a data processing module undertakes the evaluation of the test results (comparison of the output signals on the two channels and of the read-in test result with the output test result). During correct operation, the output signals from both channel blocks operated in parallel can always be compared in the same data processing module; the control of the test channel block and the comparison between the respective test loop's input signal and output signal can also be transferred to the data processing module for the absolute value tests which are to be performed alternately. This reduces the programming complexity, since a unique master-slave configuration is obtained, where control commands are always sent from the master module to the slave module and information is always sent in the opposite direction.

Correct data interchange with the central processor unit for the programmable logic controller takes place by virtue of a data processing module, preferably the one undertaking evaluation, communicating with the central control unit via a data interface. The interface module can be used in various respects in order to increase the error immunity of a programmable logic controller. Merely a plant having just one central processor unit and a communication bus has increased security against failure of the interface block itself. The use of particularly secure data lines and/or the use of particularly secure data formats and/or a reduction in the data transfer rate can likewise achieve an increase in security. According to standard, this communication takes place with one of the two data processing blocks in the interface block. The central processor unit can also use this block to request the current error status for the two channel blocks. For this purpose, it is therefore advantageous to use that block which also controls the test procedure at the same time, since in such a case data transfer from the master module to the slave module is not necessary.

To render the events in the interface module transparent to the central processor unit for the programmable logic controller in question, the data processing module communicating with the programmable logic controller's central processor unit should provide an information signal about the current test or error status. So that the central processor unit can receive information about the most recent level of knowledge in terms of the operability of the channel blocks at any time, the test result which is respectively most up to date should be stored in order that an immediate response can be delivered for every request by the programmable logic controller's central processor unit. In this context, the test result can be stored either in a register in the data processing module carrying out the test or else in an external memory.

Finally, it is within the scope of the disclosure that each data processing module has a respective dedicated data interface to a respective data link, so that it is possible to use two data lines which are entirely independent of one another. This configuration is intended particularly for use with programmable logic controllers having two communication buses operated independently of one another which each communicate with one of two central processor units operated in parallel. In such a case, a maximum degree of redundancy is obtained, while on the other hand the system structure is extremely clear, since each of the two central processor units communicates only with a respective data processing block for the interface block. Since, on the other hand, the two data processing blocks for the interface module are connected to one another, a "crossover mode" can also be maintained if required, where, by way of example, if the primary channel block fails, the main central processor unit uses the master data processing block to control the slave data processing block, and hence accesses the secondary channel block, or, if the main central processor unit fails, the auxiliary central processor unit uses the slave data processing block to give appropriate instructions to the master data processing block and can thus use the primary channel block.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
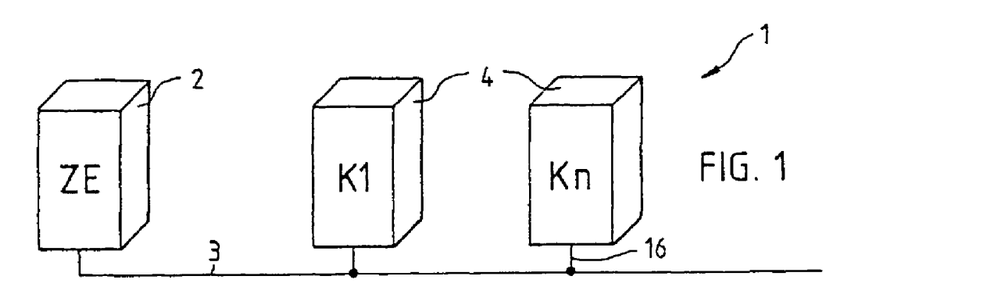
FIG. 1 shows a block diagram of a programmable logic controller having a high level of error immunity.

The programmable logic controller 1 shown in FIG. 1 comprises a central processor unit 2 of fail-safe design to which n components 4, at least one of which is of fail-safe design, are connected via a communication bus 3 operated in a fail-safe manner. The fail-safe components 2–4 form a continuous, security-related chain, with information being detected by the fail-safe component 4, being transferred to the central processor unit 2 via the communication bus 3 with a high level of security, and being logically combined therein in order to obtain control commands which can be used to prompt a reaction from an actuator in the plant via the communication bus 3 and an interface component 4 which is in turn fail-safe. The high level of error immunity in the individual components 2, 4 can be achieved by very careful design and by constant self-tests using a respective microprocessor or microcontroller contained in these parts 2, 4. Particularly important parts of the inventive, fail-safe interface block 4 are additionally of multiple design, in order thus to provide redundancy for the situation of a failure.

Figure 2:
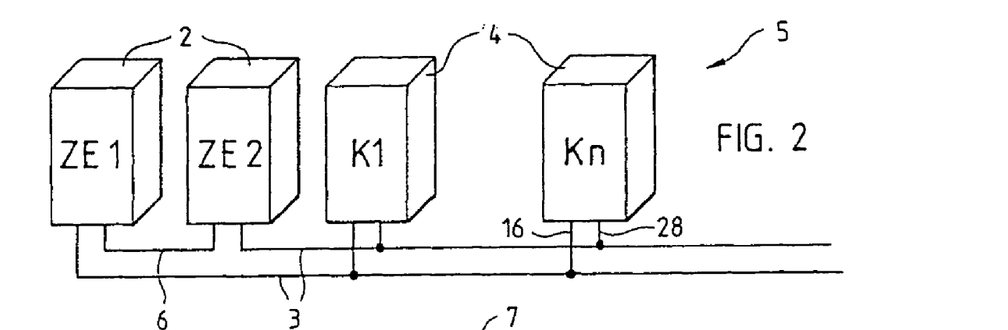
FIG. 2 shows a block diagram of a programmable logic controller having a high level of availability and a high level of error immunity.

By contrast, the programmable logic controller 5 has a particularly high level of availability by virtue of a first fail-safe central processor unit ZE 1 being supplemented by a second fail-safe central processor unit ZE 2 which is operated in parallel therewith and communicate with all n components 4 via respective dedicated, fail-safe communication buses 3. In addition, data interchange and synchronization of the two interface central processor units ZE 1, ZE 2 can take place via a coupling 6. In the case of this arrangement too, at least one of the two components 4 connected to the central processor units 2 is in the form of a fail-safe interface block in accordance with the invention so that the high level of availability of this programmable logic controller 5 does not experience any weakness in the region of the interface to the process.

Figure 3:
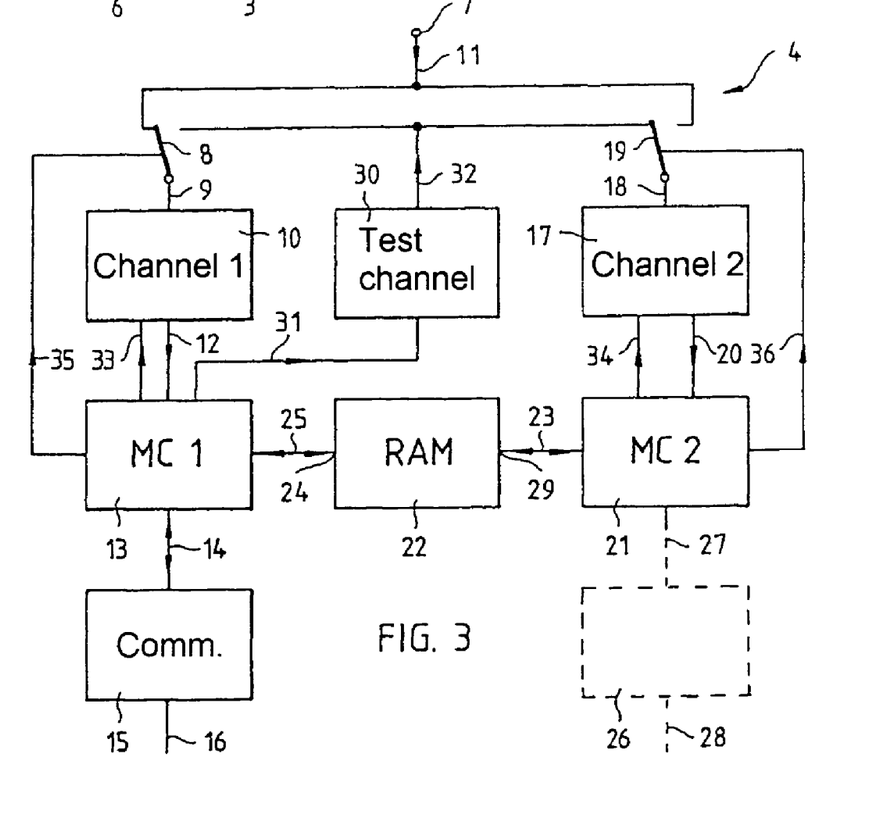
FIG. 3 shows the basic design of an interface module in accordance with the invention.

FIG. 3 shows a block diagram of an inventive fail-safe interface block 4 in the form of an analog input unit which illustrates the basic design and the basic manner of operation of a block 4 in accordance with the invention.

The analog input 7 connected to the plant is connected via a changeover switch 8 to the input 9 of a first transmission channel 10 whose task is ultimately to transform the analog signal 11 into a digital signal 12 which represents a series of several numerical representations of the amplitude of the analog signal 11, which amplitude is sampled at short intervals of time. This digital signal 12 is read in by a first data processing block 13 in the form of a microcontroller and is conditioned if appropriate, for example by adding an offset value, multiplying it by a scaling factor, or else by compiling a message 14 which contains the amplitude information and may identify it as such and which is then transferred by a communications module 15 via the link 16 and the fail-safe communication bus 3 to the central processor unit 2 for the programmable logic controller 1, or to the main central processor unit ZE 1 for the controller 5 with a high level of availability.

Since the necessary signal conversion and the active parts required for this purpose mean that the transmission channel 10 has a likelihood of failure which does not disappear, the invention provides a largely identical, second transmission channel 17 whose analog input connection 18 can likewise be connected to the analog input 7 of the inventive interface module 4 via a changeover switch 19. The analog signal 11 converted by the second transmission channel 17 into a binary pulse train 20 is supplied to a second data processing block 21 which is connected to the output 20 of the second transmission channel 17 and performs the necessary conditioning in order to obtain normalized digital values which, when the two transmission channels 10, 17 are operated simultaneously, should ideally be identical to the values generated by the first data processing block 13.

The normalized values obtained in the second data processing block 21 in such a manner are transferred 23 to a writable and readable memory module 22 and can be read 25 therefrom via a further connection 24 on this memory module 22 by the first data processing block 13 as required. It is thus possible for the first data processing block 13 to compare the two results from the two transmission channels 10, 17, and as soon as relatively large discrepancies arise in this context, there is without doubt an error in at least one channel transmission block 10, 17.

The control 33 for the first transmission channel 10 is assigned, like the actuation 35 for the first changeover switch 8, to the first data processing block 13, while the corresponding functions 34, 36 for the second transmission channel 17 and for the second changeover switch 19 are adopted by the second data processing block 21.

In addition, a dedicated communication module 26 can also be connected 27 to the second data processing block 21 in order to allow communication with the auxiliary central processor unit ZE 2 via the dedicated communication module's output 28, using the communication bus 3 which is connected thereto.

Upon the occurrence of a malfunction established by the data processing block 13, a corresponding status register can be set, so that, in the event of a request from the central processor unit ZE, ZE 1, this error state is reported further, or the data processing block 13 can independently send an appropriate error message to the central processor unit ZE, ZE 1 in question. In addition, the information about the error status can also be recorded in the writable and readable memory 22, from where it can be read in by the second data processing block 21 via the memory's second connection 29 and can also be reported further to the auxiliary central processor unit ZE 2 via the second data processing block's communication module 26.

Although this first mode of operation makes it possible to establish whether at least one of the two channel transmission blocks 10, 17 is faulty, in the event of an established discrepancy it is not readily possible to make a statement regarding which of the two channel transmission blocks 10, 17 needs to be examined for the error. For this reason, an additional test option is provided, where a test channel 30, which can be controlled via connection 31 by the first data processing block 13, generates a prescribable analog signal 32 which the changeover switches 8, 19, can selectively connect to the input 9, 18 of a channel transmission block 10, 17 instead of the analog input signal 7 for the inventive interface block 4. By reading back the output signal 12, 20 from the channel 10, 17 in question and by comparing the output signal with the preset value 31 for the signal 32 which is output by the test channel 30, it is possible to establish whether the channel transmission block 10, 17 in question is operating correctly.

Preferably, only one respective channel transmission block 10, 17 is tested simultaneously, while the other one is coupled to the analog input signal 7 by its changeover switch 8, 19 and is thus able to ensure an uninterrupted flow of data. Provided that there is a second communication module 26, the value 12, 20 provided in digital signals by the transmission channel 10, 17 which respectively ensures correct operation can be interchanged between the two data processing blocks 13, 21 via the common memory 22 and can thus be transferred via the two outputs 16, 28 to the respectively connected communication buses 3 and from there to the two central processor units ZE 1, ZE 2.

After a short interval of time, the operation of the two transmission channels 10, 17 is then interchanged, which means that the other transmission path 10, 17 can now be tested. Preferably, between these phases, the two transmission channels 10, 17 are temporarily operated in parallel on the input signal 7, so that not a single measured value is lost. This is achieved by virtue of one of the two changeover switches 8, 19 always being connected to the analog input 7. Upon changeover, a switch position is accordingly always first produced in which the two changeover switches 8, 19 are connected to the analog input 7 until the respective other one is released from this signal and is applied to the test signal 32.

Figure 4:
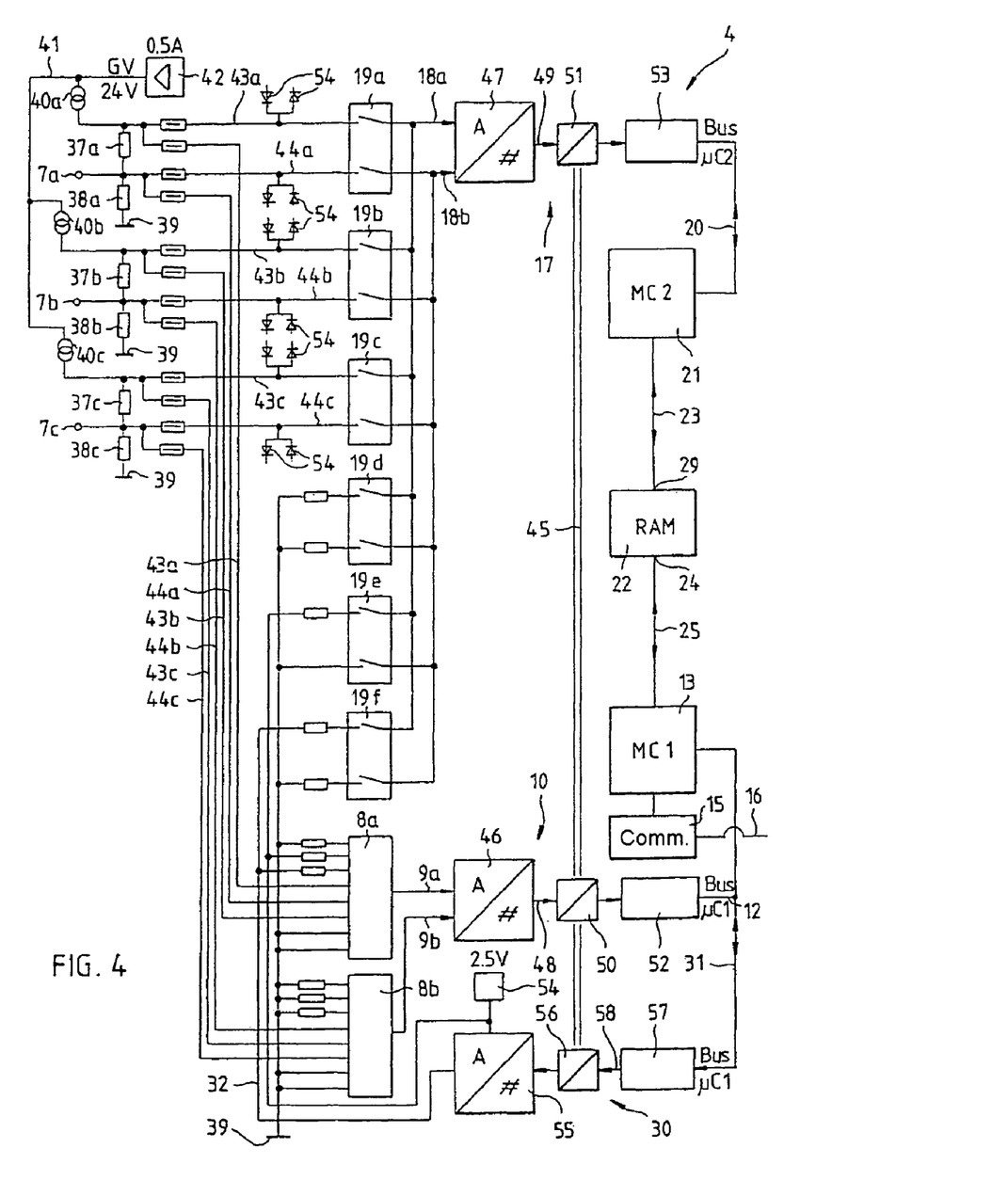
FIG. 4 shows a circuit diagram of an interface module for analog input in accordance with the invention.

A circuit designed in hardware for the purpose of producing the functions which have just been described is shown in FIG. 4.

FIG. 4 shows that the inventive interface module 4 has a total of three analog inputs 7a–7c, each of which can be connected to each of the two transmission channels 10, 17. Each analog input stage 7a–7c has been designed using a voltage divider comprising two resistors 37a–37c and 38a–38c. One end of these voltage dividers 37, 38 is connected to a ground connection 39, while the respective other end potential and the center tap are in the form of voltage U and current I inputs, 7a–7c, whose rated voltage and current levels are converted, by the voltage divider 37, 38 in question, into voltage levels which are compatible with modules arranged thereafter. A supply DC voltage 41 of, by way of example, 24 volts, which is provided by an amplifier 42 at sufficient low impedance, supplies, by way of example, connected sensor current sources 40a–40c, of 20 mA each, for example, which are modulated by the sensed signal. The input voltage considered to be relevant is then accordingly the voltage on the voltage divider center tap 7a–7c and/or on the voltage input U in question, and this voltage is applied, possibly via two respective lines 43a–43c and 44a–44c, to the switches 8, 19, from where they can be connected in pairs to the inputs 9a, 9b and 18a, 18b of one or both transmission channels 10, 17. Since the analog inputs 7a–7c are not connected to the general ground as a result of a potential isolator 45, which will be explained further below, the analog ground 39 can be set in any relation to the input voltages 7a–7c.

The voltage difference across the resistors 37 is accordingly regarded as a positive voltage by the transmission channel 10, 17 in question and is transformed by an analog frequency converter 46, 47 into a pulse train 48, 49 of moderate frequency. This pulse train 48, 49 can be transferred without any potential by a respective optocoupler 50, 51 to a downstream counter module 52, 53 which respectively counts the pulses arriving within a prescribed interval of time and thus delivers a measure of the frequency 48, 49. This counter reading is requested by the respectively coupled data processing block 13, 21 whenever the prescribed interval of time has elapsed, and the counter is then reset to zero and is enabled again. The frequency-proportional counter reading 12, 20 thus represents a binary analogon for the present voltage value at the respectively connected analog input 7a–7c and can be normalized by the data processing block 13, 21 in question if appropriate in order to obtain a digital value which is accessible for further processing.

By virtue of the digital value 20 delivered by the transmission channel 17 being made available to the first data processing block 13 by the data processing block 21 using a writable and readable memory 22, this arrangement can be used for simultaneously converting two different input signals 7a, 7b into digital values and forwarding them 16 to a central processor unit ZE, ZE 1 via the communication block 15. On the other hand, it is also possible to connect 8, 19 the same input signal 7a–7c to both transmission channels 10, 17 in parallel and to have the digital values 12, 20 obtained in such a case compared with one another by the data processing block 13, for example by subtraction, in order to obtain grounds for whether an error has occurred in one of the two transmission channels 10, 17.

With an input voltage 7a–7c which is different than zero, the input signal 9, 18 for the transmission channel 10, 17 in question changes, so that the frequency 48, 49 and accordingly the counter output signal 12, 20 change accordingly.

The signal lines 43, 44 connected downstream of the inputs 7a–7c have overvoltage protection diodes 54 for keeping away scattered interference spikes from the inputs 9, 18 of the transmission channels 10, 17. The circuits 8a and 8b have integrated protective diodes.

The drawing shows two different types of switches: the switches 8a, 8b are each 1-out-of-n multiplexers for each of the two input connections 9a, 9b of the connected transmission channel 10, while the switching modules 19a–19f are in the form of 2×ON switches. The respective actuation signals for these switching modules 8a, 8b and 19a–19f are generated by the data processing blocks 13, 21 and additionally have separate potentials, so that no noise can pass through the barrier 45 into the data processing area 13, 21 on this path either. To ensure correct operation, the switches 8a, 8b each need to switch through the mutually corresponding inputs to give the output signals 9a, 9b. On the other hand, for the circuit arrangement having the switches 19a–19f, it is necessary to ensure that only a single switch module 19a–19f is ever on.

Observing these switching rules, each of the two transmission channels 10, 17 can have not only the three input signal connections 7a–7c but also three test signals switched through for it. This can be recognized most clearly in the case of the transmission channel 17, where a dedicated switch 19d–19f is provided for each test mode. If, of these, the switch 19d is turned on, then the same voltage is applied to both inputs 18a, 18b of the analog frequency converter 47, namely the analog ground potential 39. Consequently, a counter value of zero must always be read 20 in the case of this test mode. If this is not the case, then the tested channel is faulty.

A further switch 19e can be used to connect firstly the ground potential 39 and secondly a firmly prescribed reference voltage 54 of, by way of example, 2.5 V relative to the ground potential 39 to the inputs 18a, 18b of the analog frequency converter 47, and if a value corresponding to this voltage amplitude 34 is not read 20 from the counter 53, there is likewise an error.

Finally, the switch 19f can be used for continuously checking the transmission channel 47 for any intermediate values. In this context, a test channel 30 is used which is actuated 31 by the data processing block 13. The core of this test channel is formed by a frequency-analog voltage converter 55 which, for the purpose of potential isolation 45 using an optocoupler 56, is loaded with a bit train which is output by a shift register 57. The shift register 57 is loaded via the control line 31 from the data processing block 13 and is then clocked using a prescribed frequency such that all the bits in this shift register 57 are output to the output 58 in a prescribed interval of time. Depending on the number of edges in the pulse train 58 which is output by the shift register 57, the frequency-voltage converter 55 generates different analog voltages 32 which—with reference to the analog ground potential 39—are then applied via the switch 19f to the inputs 18 of the transmission channel 17 which is to be tested. There, this voltage is converted back and can be read in 20 by the second data processing block 21. This block reports the recorded result via the memory 22 to the first data processing block 13, which compares the value obtained in this way at the end of the loop with the value originally output to the shift register 57 and, from this, can identify relatively large discrepancies and may establish an error.

The same test signal 39, 54, 32 can also be used to test the first transmission channel 10, with nothing but control of the multiplexers 8a, 8b needing to be carried out as appropriate.

In the case of an embodiment modified further, the input circuitry can also be duplicated for each interface module 4 overall, for example up to the barrier 45, in order to improve security further. In such a case, for the association between the inputs 7a, 7b and 7c and the modules 8, 19 and/or the association between the voltage-frequency converters 46, 47 and the data processing blocks 13, 21 in the case of the two input circuits can be effected crosswise, so that the two input circuits are actuated more or less parallel in opposite directions by the data processing blocks 13, 21.

The invention has been described in detail with particular reference to preferred embodiments thereof and examples, but it will be understood that variations and modifications can be effected within the spirit and scope of the invention.

The invention claimed is:

1. An interface module having a high level of error immunity, between a programmable logic controller and a peripheral device, comprising:
   at least first and second analog input channels having a substantially identical design for parallel signal processing;
   a selection unit to selectively connect one of the first and second analog input channels to the peripheral device;
   a first data processing block to test the respective other of the first and second analog input channels without interrupting the flow of data via the selected channel; and
   a second data processing block to condition data to be transferred during a test phase;

wherein each of the two data processing blocks is associated with one respective channel to perform both the signal conditioning and testing of the channel associated therewith.

2. The interface module as claimed in claim 1, wherein the two data processing blocks are coupled to one another.

3. The interface module as claimed in claim 2, wherein the two data processing blocks are coupled to one another via in-module connections.

4. The interface module as claimed in claim 3, wherein the two data processing blocks are coupled to one another via a memory to which both data processing blocks have access.

5. The interface module as claimed in claim 4, wherein the two data processing blocks are connected to different inputs/outputs of the memory.

6. The interface module as claimed in claim 1, wherein the interface module converts an analog input from the peripheral device into a digital output to the programmable logic controller.

7. The interface module as claimed in claim 1, wherein the two channels are arranged on the same circuit board.

8. The interface module as claimed in claim 7, wherein at least one data processing block is arranged together with the two channels on the same circuit board.

9. The interface module as claimed in claim 1, wherein signal conversion takes place between an analog signal comprising current or voltage levels and an alternating signal with a frequency which is proportional to the analog signal.

10. An interface module having a high level of error immunity, between a programmable logic controller and a peripheral device, comprising:
at least first and second analog input channels having a substantially identical design for parallel signal processing;
a selection unit to selectively connect one of the first and second analog input channels to the peripheral device; and
a first data processing block to test the respective other of the first and second analog input channels without interrupting the flow of data via the selected channel, wherein
the interface module further comprises an output and read-in test unit, connected between the first data processing block and one of the channels while the other channel is connected to the peripheral device, such that a loop is created with the first data processing block, the test unit and the channel connected to the test unit, and
the first data processing block tests the loop without interrupting the flow of data via the respective other channel.

11. The interface module as claimed in claim 10, wherein the test unit produces a test signal, and
the loop checks whether the test signal has been processed correctly.

12. The interface module as claimed in claim 11, wherein actuation of the test unit is associated with the first data processing block.

13. The interface module as claimed in claim 11, wherein the interface module further comprises an output and read-in test unit, connected between the first data processing block and one of the channels while the other channel is connected to the peripheral device, such that a loop is created with the first data processing block, the test unit and the channel connected to the test unit, and
the first data processing block tests the loop without interrupting the flow of data via the respective other channel.

14. The interface module as claimed in claim 13, wherein actuation of the test unit is associated with the primary data processing block.

15. The interface module as claimed in claim 14, wherein the two channels are arranged on the same circuit board.

16. The interface module as claimed in claim 15, wherein at least one data processing block is arranged together with the two channels on the same circuit board.

17. The interface module as claimed in claim 16, wherein both channels, and also the test unit, are provided with a potential isolator.

18. The interface module as claimed in claim 17, wherein signal conversion takes place between an analog signal comprising current or voltage levels and an alternating signal with a frequency which is proportional to the analog signal.

19. The interface module as claimed in claim 18, wherein the potential isolator is used for the alternating signal.

20. The interface module as claimed in claim 19, wherein the alternating signal is supplied to a counter module in order to produce a digital value which is proportional to the frequency of the alternating signal, the counter module counting the pulses within a fixed interval of time.

21. The interface module as claimed in claim 19, wherein the alternating signal is output from a module having a serial output, which outputs a prescribed number of output bits in a prescribed interval of time.

22. An interface module having a high level of error immunity, between a programmable logic controller and a peripheral device, comprising:
at least first and second analog input channels having a substantially identical design for parallel signal processing;
a selection unit to selectively connect one of the first and second analog input channels to the peripheral device; and
a first data processing block to test the respective other of the first and second analog input channels without interrupting the flow of data via the selected channel,
wherein both channels, and preferably also a test unit, are provided with a potential isolator.

23. An interface module having a high level of error immunity, between a programmable logic controller and a peripheral device, comprising:
at least first and second analog input channels having a substantially identical design for parallel signal processing;
a selection unit to selectively connect one of the first and second analog input channels to the peripheral device; and
a first data processing block to test the respective other of the first and second analog input channels without interrupting the flow of data via the selected channel,
wherein signal conversion takes place between an analog signal comprising current or voltage levels and an alternating signal with a frequency which is proportional to the analog signal; and
wherein a potential isolator is used for the alternating signal.

24. An interface module having a high level of error immunity, between a programmable logic controller and a peripheral device, comprising:

at least first and second analog input channels having a substantially identical design for parallel signal processing;

a selection unit to selectively connect one of the first and second analog input channels to the peripheral device; and a first data processing block to test the respective other of the first and second analog input channels without interrupting the flow of data via the selected channel, wherein signal conversion takes place between an analog signal comprising current or voltage levels and an alternating signal with a frequency which is proportional to the analog signal; and wherein the alternating signal is supplied to a counter module in order to produce a digital value which is proportional to the frequency of the alternating signal, the counter module counting the pulses within a fixed interval of time.

25. An interface module having a high level of error immunity, between a programmable logic controller and a peripheral device, comprising:

at least first and second analog input channels having a substantially identical design for parallel signal processing;

a selection unit to selectively connect one of the first and second analog input channels to the peripheral device; and a first data processing block to test the respective other of the first and second analog input channels without interrupting the flow of data via the selected channel, wherein signal conversion takes place between an analog signal comprising current or voltage levels and an alternating signal with a frequency which is proportional to the analog signal; and wherein the alternating signal is output from a module having a serial output, which outputs a prescribed number of output bits in a prescribed interval of time.

26. A method for operating an interface module between a programmable logic controller and a peripheral device, comprising:

selectively connecting one of two substantially identical analog input channels to the peripheral device;

connecting the other input channel to a first data processing block without interrupting a flow of data via the selected channel;

subtracting output signals from the two channels from one another to produce a result; and comparing the result with at least one prescribed limit value in order to identify an error, wherein in a test mode, one channel is used for signal transmission and the other channel is subjected to a test by outputting a test signal, processing the test signal and reading the test signal after processing, the test signal which is output and the test signal which is read are subtracted from one another to produce a result, the result of the subtraction is compared with at least one prescribed limit value in order to identify if there is an error;

the test mode is repeated at short intervals of time, with a first of the two channels and then a second of the two channels being respectively tested, and during the test mode, the channel not being tested performs signal transmission.

27. The method as claimed in claim 26, wherein the first data processing block evaluates the result of the test.

28. The method as claimed in claim 26, wherein the first data processing block evaluates the result of the test.

29. The method as claimed in claim 28, wherein the first data processing block communicates with a central processor unit for the programmable logic controller via a data interface.

30. The method as claimed in claim 29, wherein the first data processing block communicating with the central processor unit for the programmable logic controller provides an information signal regarding a current test or an error status.

31. The method as claimed in claim 30, wherein
there are two data processing blocks,
each data processing block has a respective dedicated data interface to a respective data link, so that it is possible to use two data lines which are entirely independent of one another.

32. A method for operating an interface module between a programmable logic controller and a peripheral device, comprising:

selectively connecting one of two substantially identical analog input channels to the peripheral device;

connecting the other input channel to a first data processing block without interrupting a flow of data via the selected channel;

subtracting output signals from the two channels from one another to produce a result; and comparing the result with at least one prescribed limit value in order to identify an error, wherein the first data processing block evaluates the result of the test; and wherein the first data processing block communicates with a central processor unit for the programmable logic controller via a data interface.

33. The method as claimed in claim 32, wherein the first data processing block communicating with the central processor unit for the programmable logic controller provides an information signal regarding a current test or an error status.

34. A method for operating an interface module between a programmable logic controller and a peripheral device, comprising:

selectively connecting one of two substantially identical analog input channels to the peripheral device;

connecting the other input channel to a first data processing block without interrupting a flow of data via the selected channel;

subtracting output signals from the two channels from one another to produce a result; and comparing the result with at least one prescribed limit value in order to identify an error, wherein there are two data processing blocks,
each data processing block has a respective dedicated data interface to a respective data link, so that it is possible to use two data lines which are entirely independent of one another.

* * * * *